United States Patent
Ahmed et al.

(10) Patent No.: US 10,578,483 B2
(45) Date of Patent: Mar. 3, 2020

(54) WIRELESS BUILDING SENSOR POWERED BY AMBIENT ENERGY SOURCES WITH INTEGRATED SWITCHING MODULE

(71) Applicant: SCHNEIDER ELECTRIC USA, INC., Andover, MA (US)

(72) Inventors: Dewan Ishtiaque Ahmed, Toronto (CA); Tithi Tasnuva, Toronto (CA); Michael Mackenzie, Andover, MA (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 55 days.

(21) Appl. No.: 15/835,655

(22) Filed: Dec. 8, 2017

(65) Prior Publication Data

US 2019/0178710 A1    Jun. 13, 2019

(51) Int. Cl.
*G01J 1/42* (2006.01)
*G05B 19/042* (2006.01)
(Continued)

(52) U.S. Cl.
CPC .......... *G01J 1/4204* (2013.01); *G05B 13/024* (2013.01); *G05B 19/0428* (2013.01); *G06F 1/3203* (2013.01)

(58) Field of Classification Search
CPC .................................................... G01J 1/4204
See application file for complete search history.

(56) References Cited

U.S. PATENT DOCUMENTS 7,808,548 B1    10/2010  Popescu-Stanseti et al.
8,994,551 B2 *  3/2015  Pitchford ............... G01D 4/004
                                                    136/205
(Continued)

FOREIGN PATENT DOCUMENTS

WO    WO 2010093234 A2    8/2010

OTHER PUBLICATIONS

International Search Report and Written Opinion for International Application No. PCT/US2018/064418 dated Mar. 14, 2019.
(Continued)

*Primary Examiner* — Rocio Del Mar Perez-Velez
*Assistant Examiner* — Hawa Z Dirie
(74) *Attorney, Agent, or Firm* — Locke Lord LLP

(57) ABSTRACT

A battery-less sensor device includes a sensor to sense an environmental condition, a power supply system, a memory, a communication device, and a processor. The power supply system includes energy harvesting devices to harvest energy from ambient energy sources for powering one or more components of the sensor device, and an energy storage device to store harvested energy. The memory stores sensor data associated with the environmental condition sensed by the sensor. The communication device transmits the sensor data to a BMS or remote device. The processor is configured to dynamically select one or more energy sources from the ambient energy sources to power one or more components of the sensor device according to an availability of energy from the ambient energy sources and/or an energy consumption requirement of the one or more components of the sensor device, and to control supply of power to the one or more components.

21 Claims, 6 Drawing Sheets

(51) Int. Cl.
*G06F 1/3203* (2019.01)
*G05B 13/02* (2006.01)

(56) References Cited

U.S. PATENT DOCUMENTS

| | | | | |
|---|---|---|---|---|
| 9,380,531 | B1* | 6/2016 | Subramanian | H04W 52/0216 |
| 9,721,210 | B1* | 8/2017 | Brown | G06N 20/00 |
| 9,851,729 | B2* | 12/2017 | Mucignat | G05D 23/1905 |
| 9,877,651 | B2* | 1/2018 | Watson | A61B 5/0002 |
| 10,263,476 | B2* | 4/2019 | Leabman | H02J 50/20 |
| 2006/0271678 | A1* | 11/2006 | Jessup | G06F 1/3203 |
| | | | | 709/224 |
| 2007/0063833 | A1* | 3/2007 | Kates | G08B 25/009 |
| | | | | 340/521 |
| 2010/0026100 | A1* | 2/2010 | Teggatz | H02J 7/0055 |
| | | | | 307/82 |
| 2011/0248846 | A1* | 10/2011 | Belov | H04Q 9/00 |
| | | | | 340/539.1 |
| 2012/0256492 | A1 | 10/2012 | Song et al. | |
| 2013/0324059 | A1* | 12/2013 | Lee | H04W 52/02 |
| | | | | 455/127.1 |
| 2014/0266684 | A1* | 9/2014 | Poder | G08B 25/003 |
| | | | | 340/521 |
| 2015/0035378 | A1* | 2/2015 | Calhoun | A61B 5/04004 |
| | | | | 307/104 |
| 2015/0303975 | A1* | 10/2015 | Calhoun | H04B 1/1607 |
| | | | | 455/73 |
| 2016/0323118 | A1* | 11/2016 | DiPoala | H04L 12/2827 |
| 2017/0104467 | A1* | 4/2017 | Nikitin | H02J 50/10 |
| 2017/0171807 | A1* | 6/2017 | Noh | H04L 43/08 |
| 2017/0257826 | A1 | 9/2017 | Kates | |
| 2017/0271910 | A1* | 9/2017 | Lazaro | H02J 7/34 |
| 2017/0288472 | A1* | 10/2017 | Stoufer | H02J 50/80 |
| 2018/0267591 | A1* | 9/2018 | Kurian | G06F 1/3228 |
| 2019/0020290 | A1* | 1/2019 | Feng | H02J 7/34 |
| 2019/0055835 | A1* | 2/2019 | Brookes | E21B 47/042 |

OTHER PUBLICATIONS

MICA2 Product Datasheet: http://www.investigacion.frc.utn.edu.ar/sensores/Equipamiento/Wireless/MICA2_Datasheet.pdf.

María Gabriela Calle Torres, (1995). Energy Consumption in Wireless Sensor Networks using GSP—http://d-scholarship.pitt.edu/7682/1/callemariag072606.pdf.

Chen, S., Yao, J., & Wu, Y. (2012). Analysis of the power consumption for wireless sensor network node based on zigbee. Procedia Engineering, 29, 1994-1998. doi:10.1016/j.proeng.2012.01.250.

Kim, Sangkil, et al. "Ambient RF Energy-Harvesting Technologies for Self-Sustainable Standalone Wireless Sensor Platforms." Proceedings of the IEEE 102.11 (2014): 1649-66.

* cited by examiner

WIRELESS BUILDING SENSOR POWERED BY AMBIENT ENERGY SOURCES WITH INTEGRATED SWITCHING MODULE

FIELD

The present disclosure is related to a sensor device which is powered using ambient energy sources.

BACKGROUND

Commercial buildings, including factories, increasingly need to be more energy efficient and sustainable. To improve energy efficiency and management of such buildings, a building management system (BMS) can be used to control and monitor various aspects or systems (or services) in a building, including an environmental system, security system, power system, lighting system or other systems used in the building. The BMS can include both hardware and software components linked together and configured to monitor and control the building systems and environment using information obtained from sensors. The sensor can collect relevant environmental parameters, which can include an atmospheric condition in the building (such as temperature, pressure, humidity, carbon dioxide content, etc.), a lighting condition such as brightness in regions or rooms in the building, a movement or activity in the building, energy usage or faults in certain regions or equipment in the building, and/or any other parameters used to facilitate efficient use of energy by the various systems in the building.

For example, the BMS can regulate environmental parameters such as temperature, humidity, carbon dioxide content, and oxygen content. The BMS can use temperature measurements to determine adjustments to the heating and cooling functions of a building environmental system, such as an HVAC system. Similarly, the BMS can use humidity and carbon dioxide content measurements to determine whether to draw in fresh air and at what rate. The BMS can be configured to operate while optimizing for energy efficiency, for the comfort of occupants, or for parameters desired in a particular setting, such as an operating range of sensitive equipment. For instance, the BMS can monitor the level of carbon dioxide, and mix in fresh outside air with inside air to increase the amount of oxygen while also minimizing heating and cooling losses.

Sensors with wireless communication capabilities can be used to monitor, track and relay data to the BMS, particularly from difficult to access locations in a building or equipment in a building. However, when placed in these locations, it may not be possible or feasible to power the sensors using the building's electrical system. Instead, the sensors are powered by a battery. The inaccessibility of a location of the sensors, however, may make it difficult for service personnel to access and replace a battery in the sensors. Furthermore, the locations of the sensors may subject them to harsh environmental conditions, such as high temperatures, vibration, electromagnetic forces, dust and dirt, snow, and so forth. As a consequence, sensor damage or failure resulting from battery failure or prolonged exposure to harsh environment conditions have a real cost to business operations, safety and the environment.

SUMMARY

In accordance with an example embodiment, a sensor device includes one or more sensors, a power supply system, a memory, a communication device, and one or more processors. The one or more sensors sense one or more environmental conditions. The power supply system includes a plurality of energy harvesting devices, such as transducers, to harvest energy from a plurality of ambient energy sources for powering one or more components of the sensor device, and an energy storage device to store energy harvested from the energy harvesting devices. The memory stores sensor data associated with the one or more environmental conditions sensed by the one or more sensors. The communication device transmits the sensor data to a remote device, such as across a network. The one or more processors are configured to dynamically select one or more energy sources from the ambient energy sources to power one or more components of the sensor device according to an availability of energy from the ambient energy sources and/or an energy consumption requirement of the one or more components of the sensor device, and to control supply of power to the one or more components of the sensor device. The sensor device can include a pyramid-shaped housing to house and protect the various components of the sensor device.

The design and construction of such a sensor device can eliminate the need for a battery, thereby addressing problems associated with battery replacement and increasing environmental and economic benefits due to the battery-less design. Thus, the sensor device can be entirely powered by ambient energy to allow for an entirely battery-less (or batteryless) operation, which is important for deployment in dangerous areas (e.g., high radiation, unsafe conditions, etc.). Furthermore, such a sensor device can be designed to operate at a net-zero energy mode, which is a cheaper and provides an energy efficient solution, particularly when such sensor devices are employed in a wireless sensor network. In addition, the design and construction of the sensor device can significantly increase the life expectancy of the device.

The ambient energy sources can include at least solar energy, vibrational energy, thermal energy, and/or radio frequency energy. The energy harvesting devices can comprise of at least a solar energy transducer to harvest solar energy, an electromagnetic energy transducer to harvest electromagnetic energy, a thermal energy transducer to harvest thermal energy, and a piezoelectric transducer to harvest vibrational energy. At least one of the energy harvesting devices can, for example, be a sensor from the one or more sensors.

To dynamically select, the one or more processors can be configured to determine the energy consumption requirement for powering the one or more components; to determine the available energy from each of the ambient energy sources; and to select the one or more energy sources from the ambient energy sources based on the determined energy consumption requirement and the determined available energy.

The one or more processors can be configured to control a supply of available power from the power supply system selectively to the one or more sensors, the memory, the communication device, and the one or more processors according to an energy consumption priority level of an operation to be performed, and an availability of energy from the selected energy source. The one or more processors can include a first processor of a controller configured to implement a sensing operation by the one or more sensors, and a second processor of a separate smart module configured to dynamically select one or more energy sources from the ambient energy sources. The available power can be supplied to components of the sensor device in the following order from a higher energy consumption priority level to a lower energy consumption priority level: (1) the first processor, the one or more sensors and the memory to perform a sensing operation, (2) the first processor and the communication device to perform a communication operation, and (3) the second processor to perform a dynamic selection operation (e.g., such as to choose between optimum ambient energy input).

The one or more processors can be further configured to cause the sensor data to be stored in the memory when energy available from the ambient energy sources is insufficient to power the communication device. Furthermore, the one or more processors can be configured to cause the sensor data to be transmitted via the communication device to the remote device when energy available from the ambient energy sources is sufficient to power the communication device.

The power supply system can further include a battery (e.g., a back-up battery). The one or more processors can be further configured to cause power to be supplied from the battery to one or more components selected from the one or more sensors, the processors, the memory, the communication device, and the one or more processors when energy from the ambient energy sources is insufficient to power the one or more components.

DESCRIPTION OF THE FIGURES

The description of the various example embodiments is explained in conjunction with the appended drawings, in which.

DISCUSSION OF EXAMPLE EMBODIMENTS

Figure 1:
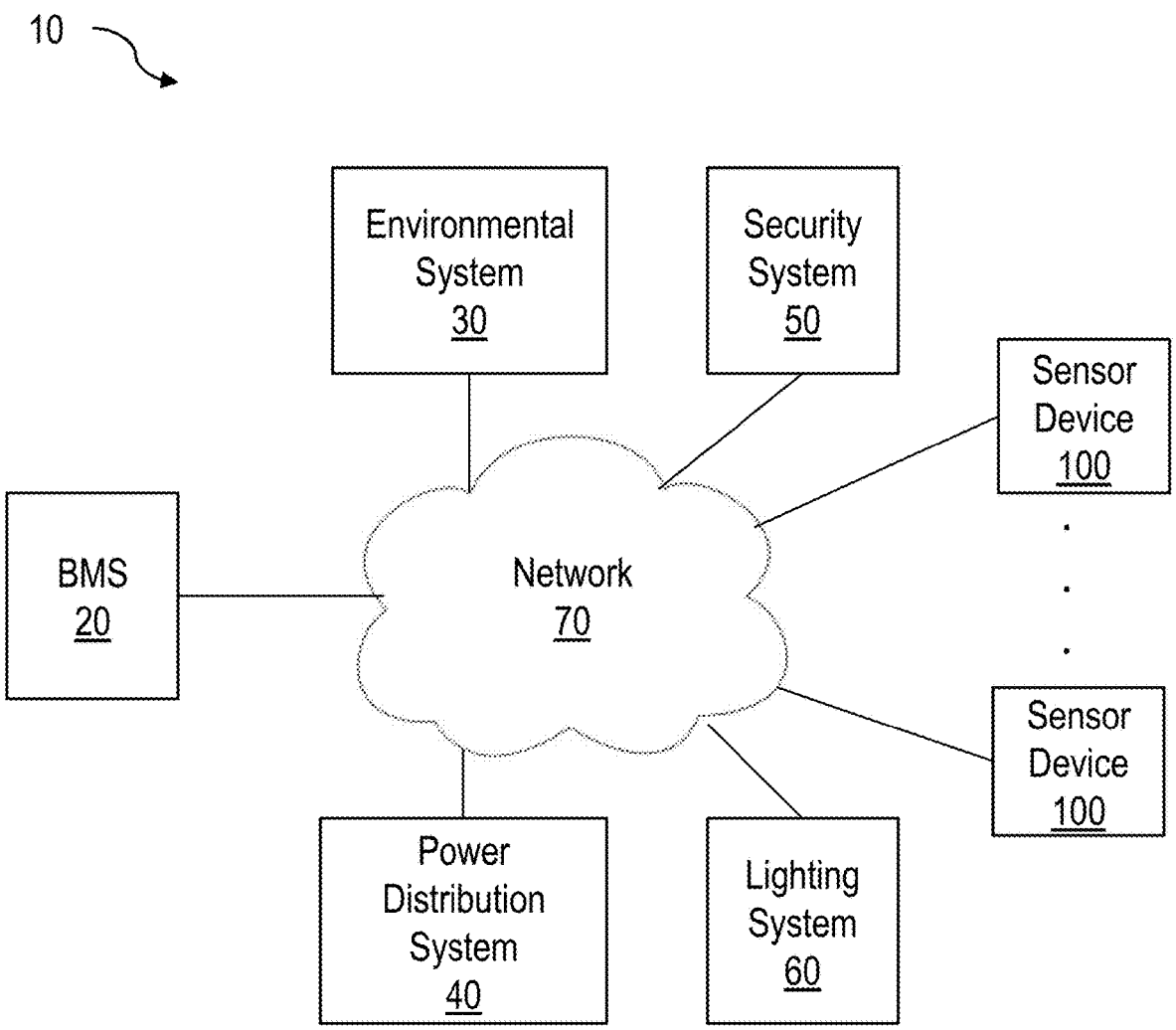
FIG. 1 illustrates an example facility, such as a building or a factory, which uses sensor devices that are powered by ambient energy sources for facilitating control over the facility's systems and services in accordance with an example embodiment of the present disclosure.

FIG. 1 illustrates an example of a facility 10, such as a building or factory, which can include a building management system (BMS) 20 for controlling operations of services provided by various facility systems, such as an environmental system 30 (e.g., air conditioning system such as an HVAC), power distribution system 40, security system 50, lighting system 60 and other systems of the facility. In this example the BMS 20 and the systems 30, 40, 50 and 60 communicate with each other across a network(s) 70, which can take the form of a wire-based network, a wireless network, or a combination thereof. The facility 10 further includes a plurality of sensor devices 100 to sense environmental conditions at various locations in or around the facility or its equipment, and to communicate sensor data to the BMS 20 and/or the systems 30, 40, 50 and 60 in the facility 10 via the network(s) 70 such as using the Internet (e.g., Internet of Things or IoT). The sensor data from the sensor devices 100 can be used by the BMS 20 and/or the systems 30, 40, 50 and 60 to control various services provided through the systems 30, 40, 50 and 60 in the facility 10, including but not limited to air conditioning, power distribution and protection, security including intruder notification, lighting control (e.g., ON, OFF, dim, etc.) or other facility services including operation of factory equipment or machinery.

Each sensor device 100 is configured to harvest energy from ambient energy sources to power one or more components of the sensor device 100, and thus, can be a battery-less device. Alternatively, the sensor device 100 can include a back-up battery such as for critical operations or an emergency condition when insufficient power is available from energy harvestable from the ambient energy sources. In either case, the sensor device 100 can incorporate energy harvesting devices, such as different types of transducers (or converters), to transform ambient energy to electrical energy. The ambient energy sources can, for example, include solar energy, vibrational energy, thermal energy, electromagnetic energy (e.g., radio frequency (RF) energy) and/or other harvestable ambient energy sources. In operation, the sensor device 100 is configured to dynamically select one or more energy sources from a plurality of the ambient energy sources to power the component(s) or operations of the sensor device 100, such as for example according to an availability of energy from the ambient energy sources, and/or an energy consumption requirement of the one or more components of the sensor device 100, and/or other factors. One or more of the sensor devices 100 can be used as a "hobo" sensor device which can be temporarily installed by service personnel or service operator as needed, or as a sensor device that is permanently installed to monitor a specific location or equipment in the facility 10 (e.g., high danger areas or difficult areas to access).

Accordingly, by relying primarily on ambient energy sources, the sensor devices 100 can operate in an environmental friendly and efficient manner without the need for a battery or power from the facility's power supply system 40. By eliminating or reducing the need for a battery, the sensor devices 100 can reduce the overall carbon footprint from the sensor network (e.g., wireless sensor network). Furthermore, the ability to power communication operations and other operations in the sensor device using ambient energy can facilitate integration to Internet of Things (IoT).

Figure 2:
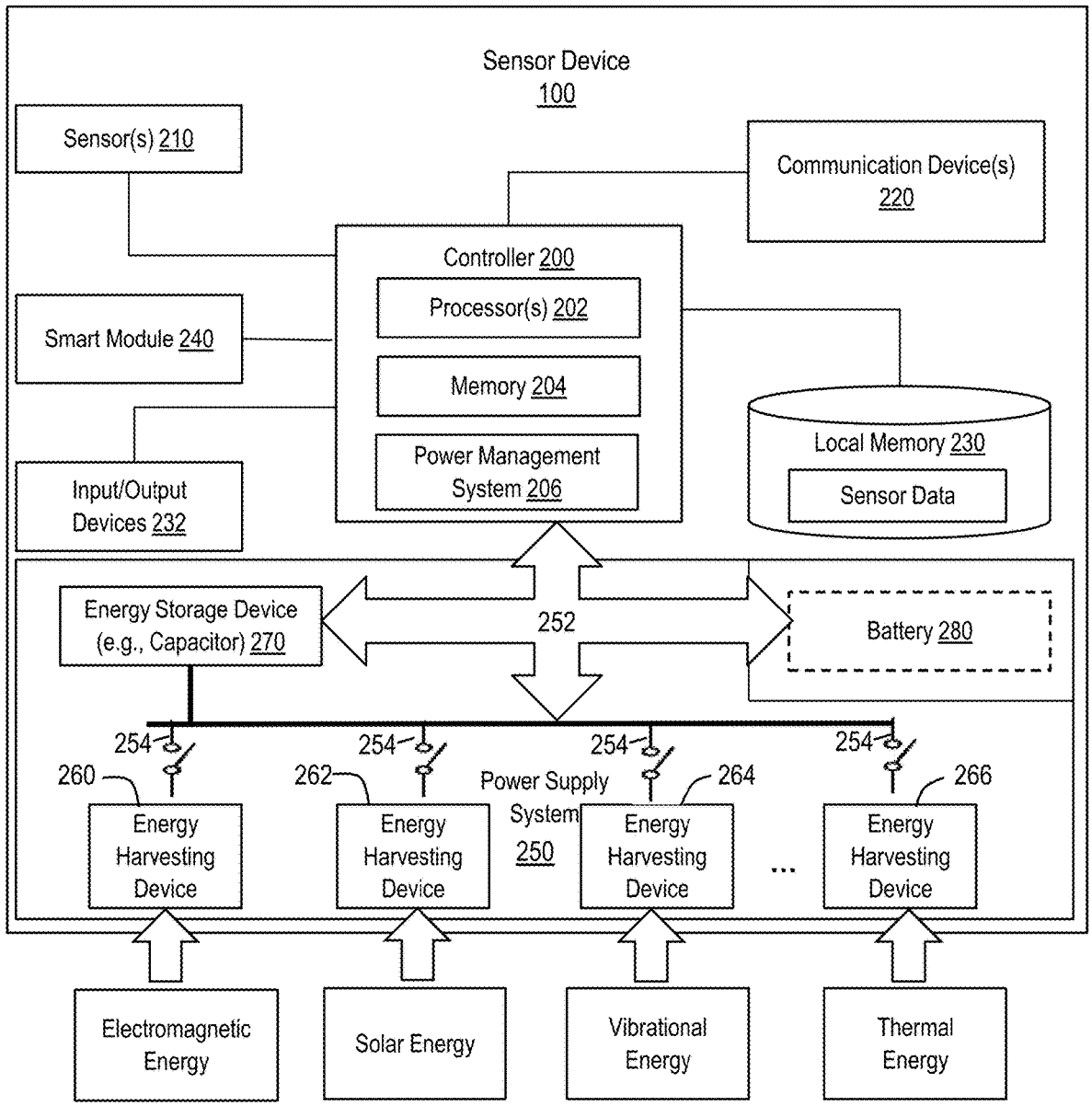
FIG. 2 illustrates an overall block diagram of example components of a sensor device, such as in FIG. 1, in accordance with an example embodiment of the present disclosure.

FIG. 2 illustrates an example of the sensor device 100, which can include a controller(s) 200, one or more sensors 210, communication device(s) 220, local memory 230, input/output (I/O) devices 232, and a power supply system 250. The sensors 210 can include, for example, passive and/or active sensors, such as a temperature sensor, humidity sensor, pressure sensor, carbon dioxide or other gas sensor, force sensor, ambient light sensor, position sensor, speed sensor, sound sensor, power/current/voltage sensor, motion sensor, and/or other sensing devices to sense environmental conditions to facilitate control over the services provided by the systems of a facility, such as the facility 10 in FIG. 1.

The communication device(s) 220 can include communication circuitry (e.g., transmitter (TX), receiver (RX), transceiver such as a radio frequency transceiver, etc.) for conducting line-based communications with a remote deice such as a USB or Ethernet cable interface, or for conducting wireless communications with a remote device, such as for example through a wireless personal area network, a wireless local area network, a cellular network or wireless wide area network. The communication device(s) 220 can include a ZigBee communication device to provide for RF communication across a network, such as the network(s) 70 in FIG. 1. The communication device(s) 220 can be used to transmit sensor data associated with the environmental condition(s) sensed by the sensor(s) 210, and to receive information including command instructions, software or configuration updates, or other information from a remote device. The command instructions may include, for example, instructions to turn ON or OFF the sensor device 100, instructions to set/reset or control power supply operation (e.g., setting a default ambient energy source for the sensor device 100, switching to a specific energy source from a plurality of the ambient energy sources available at the sensor device 100, switching to back-up battery, switching to only ambient energy sources, etc.), regular or emergency instructions to transmit sensor data associated with one or more or a specific one of the sensors 210, or other command instructions to facilitate operations of the sensor device 100 and the systems of the facility (e.g., the facility 10 of FIG. 1).

The local memory 230 is a data storage device that can store computer executable code or programs, which when executed by the controller 200, controls the operations of the sensor device 100. The local memory 230 can also store sensor data associated with environmental condition(s) sensed by one or more of the sensors 210. For example, when insufficient energy is available from the ambient energy sources to power the communication device(s) 220, the sensor data can be stored in the local memory 230 for future transmission when sufficient power is available to operate the communication device(s) 220. The local memory 230 can also store information corresponding to energy consumption requirements for the one or more components of the sensor device 100 and/or the various operations performed by the sensor device 100 (e.g., sensing operation, transmitting operation, storing operation, dynamic selection feature, and so forth). The energy consumption requirement for a component or operation can be a minimum power required to operate the component or implement the operation. Furthermore, the local memory 230 can store energy consumption priority levels for each component or combination of components of the sensor device 100, or for different operations implementable by the sensor device 100. As described below, the energy consumption priority level can be used to determine the manner in which available power from the power supply system 250, such as when limited, is allocated or utilized in the sensor device 100 according to the priority level of the component or operation, e.g., a higher priority to a lower priority. The local memory 230 can also store other information (e.g., configuration information, system/device/component parameters and settings, etc.), which is used to control and operate the various components and functions of the sensor device 100.

The I/O device(s) 232 can include input device(s), and output device(s). The input devices can include user input devices (e.g., buttons, dials, switches, or other user input devices) to enable a user to manually set or control the sensor device 100, such as selecting a default energy source from the ambient energy sources, turning ON or OFF the sensor device, changing settings for the sensor device 100, and so forth. The output devices can include a display, lights (e.g., LEDs), or other output devices to display information related to the sensor device 100, such as status information of the sensor device 100, current settings (e.g., the default energy source, etc.), and so forth.

The controller 200 is configured to control the components and operations of the sensor device 100. The controller 200 can include one or more processors 202, a memory 204, and a power management system (or sub-module) 206. The processor(s) 202 can be a processing system, which can include one or more processors, such as CPU, GPU, controller, dedicated circuitry or other processing unit, which controls the operations of the sensor device 100, including but not limited to the sensing operations by the sensor(s) 210, the communication operations via the communication device(s) 220, the data access and/or storage operations via the local memory 230, the output operations via the I/O devices 232, the selective supply of power to one or more components of the sensor device 100 according to a priority level of an operation to be performed, the dynamic selection of one or more energy sources from the ambient energy sources to power the one or more components of the sensor device 100 (also referred to as "dynamic selection feature" or "smart module operation"), or other operations described herein.

The memory 204 of the controller 200 is a data storage device that can also store computer executable code or programs, which when executed by the processor(s) 202, controls the operations of the sensor device 100. The memory 204 can also temporarily store sensor data associated with environmental condition(s) sensed by one or more of the sensors 210 or other data used by the controller 200 and its components to perform the operations of the sensor device 100. The sensor data can be data received from one of the sensors 210, or data generated by the processor(s) 202 based on data received from one or more of the sensors 210.

The power management system 206 of the controller 200 can be used to receive power from the power supply system 250, and to supply power to various components of the sensor device 100, including, for example, the sensor(s) 210, the communication device(s) 220, the local memory 230, the I/O devices 232, the smart module 240 and/or other components of the sensor device 100. The processor(s) 202, in combination with the power management system 206, can selectively control the distribution of power to the various components of the sensor device 100, such as according to an energy consumption priority level of the components and/or different operations to be performed in the sensor device 100 (e.g., sensing operation, transmission operation, dynamic selection feature, and so forth). As will be described herein, different components (or combinations thereof) or different operations of the sensor device 100 will have a greater or higher energy consumption priority level than others. As such, components or operations of the sensor device 100 will be powered with available energy from the power supply system 250 according to their priority level, e.g., from a higher energy consumption priority level to a lower energy consumption priority level. An energy pyramid showing example energy consumption priority levels is provided in FIG. 3 (discussed further below).

Instead of the controller 200 implementing the dynamic selection feature, the controller 200 can cooperate with a separate module, such as a smart module 240, which is configured to perform the dynamic selection feature. The controller 200 can be a base controller 200 to perform the primary or base operations of the sensor device 100, and the smart module 240 can be a second or secondary controller, with a processor(s) and memory, which is dedicated to implementing the dynamic selection feature.

The power supply system 250 supplies electrical energy (e.g., power, voltage, current, or other form of electrical energy) to power the components of the sensor device 100. The power supply system 250 includes a power distribution network 252 (e.g., electrical connectors, switches, and wires) to distribute power to the controller 200, which in turn can selectively control the supply of power to the other components of the sensor device 100. The power supply system 250 can distribute the power generated from energy harvested from a plurality of ambient energy sources to the controller 200, or distribute the power from a back-up battery, e.g., a battery 280, if included in the sensor device 100, to the controller 200. The power supply system 250 can transfer any excess energy harvested from the ambient energy sources to an energy storage device 270 (e.g., a capacitor) for storage thereof and future use as needed. The energy storage device 270 can, for example, be a 1 mA low leakage ceramic capacitor, or other suitable energy storage device depending on the power parameters required for the sensor device 100.

The power supply system 250 can also include a plurality of energy harvesting devices, such as 260, 262, 264 and 266, to harvest ambient energy sources, such as electromagnetic energy (e.g., RF energy), solar energy, vibrational energy, and thermal energy (e.g., temperature differential energy) respectively. The energy harvesting devices 260, 262, 264 and 266 can be transducers (or converters) to convert or transform ambient energy to electrical energy. For example, the energy harvesting device 260 can include an antenna(s) or antenna array (e.g., RF antenna) or an inductive coil or other electromagnetic transducer to convert electromagnetic energy, e.g., RF or other electromagnetic energy, to electrical energy. The energy harvesting device 262 can include a solar cell or a thin-film solar panel of solar cells or other solar transducer to convert solar energy to electrical energy. The energy harvesting device 264 can include a piezoelectric device or film or other vibrational transducer to convert vibrational energy to electrical energy. The energy harvesting device 266 can include thermoelectric generator (TEG) such as a thermocouple or other thermoelectric elements or other thermal transducer to convert thermal energy (e.g., a differential temperature) to electrical energy. One or more of the energy harvesting devices of the power supply system 250 can be one or more of the sensors 210.

One or more of the energy harvesting devices 260, 262, 264 and 266 can be built into or embedded in a housing of the sensor device 100, connected to or arranged on an outer surface of the housing of the sensor device 100 as a film or panel, or a combination thereof. The controller 200 and its components can control the switches 254 of the power supply system 250 to select one or more ambient energy sources from which to harvest energy in order to power one or more components of the sensor device. Although the distribution of power to the components of the sensor device 100 can be selectively controlled through the controller 200, such control can instead be implemented through a separate module in the sensor device 100 or through the power supply system 250.

Figure 3:
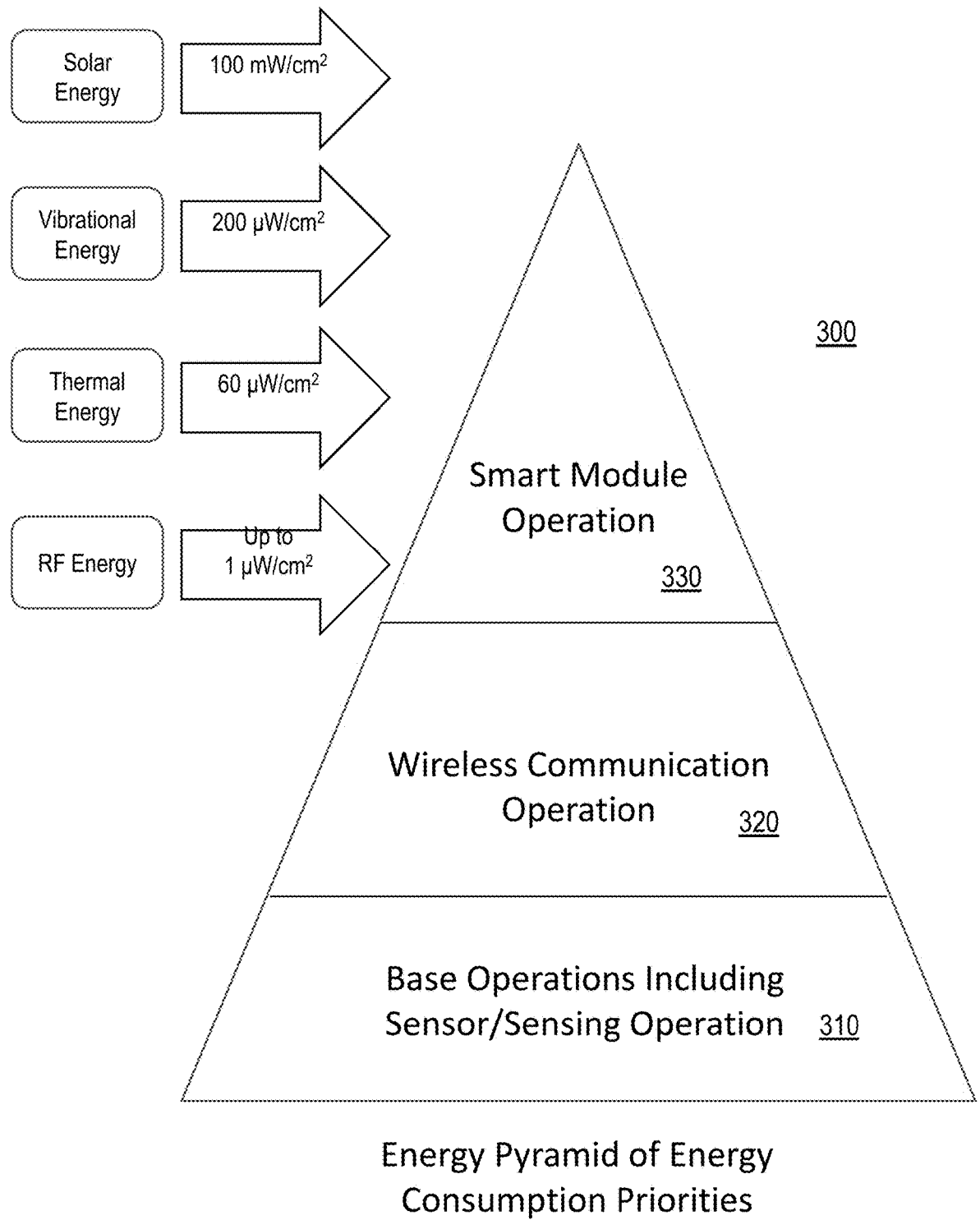
FIG. 3 is an example of an energy pyramid showing different energy consumption priority levels for different components or operations of a sensor device, such as in FIGS. 1 and 2, in accordance with an example embodiment of the present disclosure.

FIG. 3 is an example of an energy pyramid 300 showing different energy consumption priority levels for different components or operations of a sensor device, such as the sensor device 100 in FIGS. 1 and 2. In this example, a highest energy consumption priority level 310 is shown at the base of the pyramid 300, and relates to base or primary operations of the sensor device, such as the sensing operation to gather or generate sensor data corresponding to environmental condition(s) sensed by the sensor(s). A middle energy consumption priority level 320 is shown in the middle of the pyramid 300, and relates to communication operation, e.g., wireless communication operation, such as to transmit sensor data to a remote device. The lowest energy consumption priority level 330 is shown at the top of the pyramid 300, and relates to the operation of the smart module (e.g., smart module 240 in FIG. 2) or operations associated with the dynamic selection feature described herein.

The sensor device 100 can be configured to use the available power (such as generated from the ambient energy sources), particularly when limited, to selectively power components or operations according to their energy consumption priority level from a higher priority to lower priority and power availability. For example, in the sensor device 100, the available power is supplied to its components in the following order from a higher priority to a lower priority: (1) a first processor (e.g., a processor of controller 200 in FIG. 2), the one or more sensors and the memory to implement a sensing operation to gather or generate sensor data and/or a storage operation of the sensor data in the memory, (2) the first processor and the communication device to implement a transmission operation of the sensor data to a remote device, and (3) the second processor (e.g., a processor of the smart module 240 in FIG. 2) to implement the dynamic selection feature. The energy pyramid 300 is provided as an example. The sensor device 100 can be configured to implement power control according to more or less than three energy consumption priority levels for different types of operations to be performed by the sensor device 100.

In FIG. 3, various examples are also shown indicating a potential power density, which can be generated by harvesting energy from certain types of ambient energy sources. For example, it is possible to harvest 100 mW/cm$^2$ from solar energy, 200 μW/cm$^2$ from vibrational energy, 60 μW/cm$^2$ from thermal energy, and up to 1 μW/cm$^2$ from RF energy. Thus, the potential amount of power, which can be generated from these ambient energy sources, can be determined according to the surface area of the energy harvesting devices, such as, for example, on or built into a housing of a sensor device. In this way, a sensor device with communication capability can be designed and constructed to operate using primarily or only ambient energy sources. An example of a sensor device model is discussed further below.

Figure 4A:
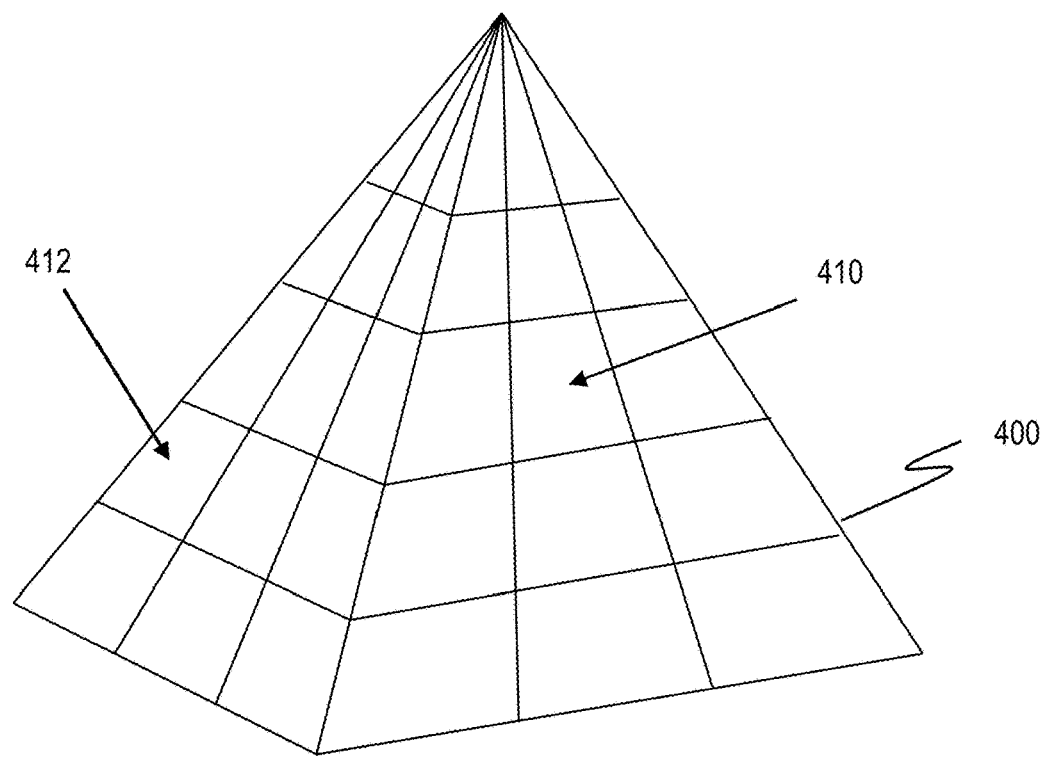
FIGS. 4A and 4B illustrate an example of a housing of a sensor device, such as in FIGS. 1 and 2, to house, protect and support the components of the sensor device, in accordance with an example embodiment of the present disclosure.
Figure 4B:
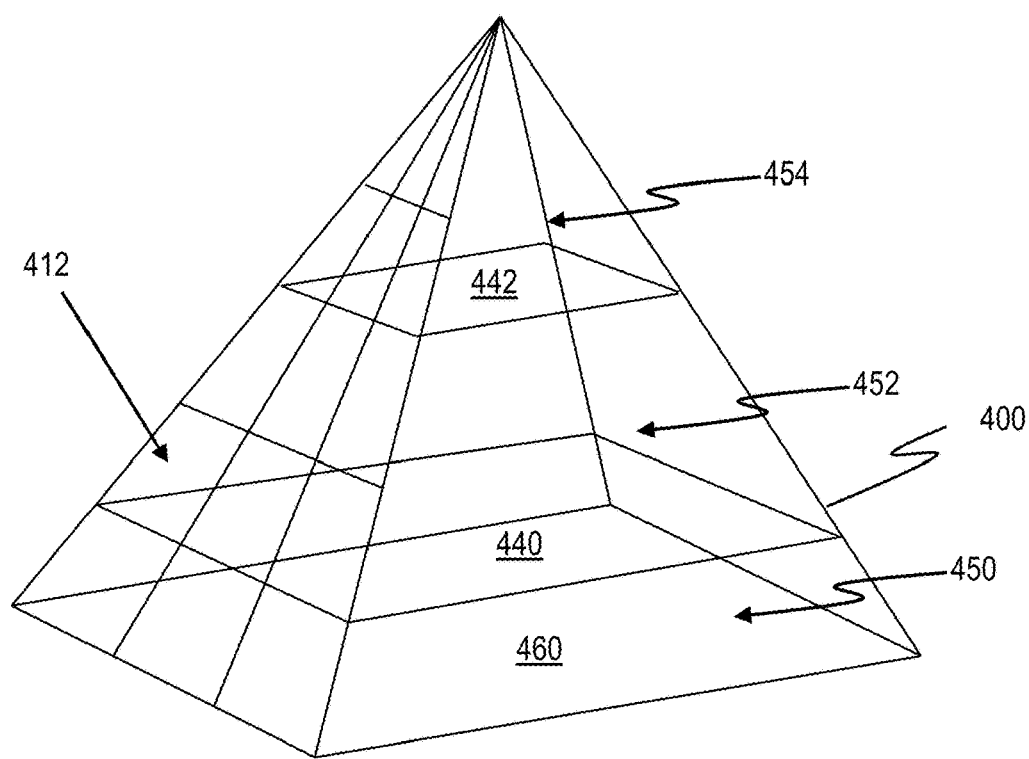

FIGS. 4A and 4B illustrate an example of a housing 400 for a sensor device, such as the sensor 100 in FIGS. 1 and 2. The housing 400 has a pyramid-shape to protect the components of the sensor device from harsh environmental conditions, to reduce an amount of dirt, debris or snow collecting on the sensor device, and to provide sufficient surface area to arrange and/or connect energy harvesting device(s) to harvest ambient energy sources to power the components of the sensor device. The pyramid-shaped housing 400 can have a base that is, for example, 60 mm on each side of the base, and a height of 90 mm (e.g., a height from a center of the base to the top of the pyramid). The housing 400 can be formed of a plastic material (e.g., polyurethane or other polymers) or other dielectric material, and have one or more cavities to support the components of the sensor device. The triangular sides of the housing 400 can be connected together using snap-in joints or other connectors to facilitate assembly or disassembly of the housing, including opening of removing one side of the housing to access the one or more cavities of the housing 400 and any components supported therein. As shown in FIG. 4A, the housing 400 can have arranged or connected thereon or built therein a plurality of panels, e.g., 410 and 412, of energy harvesting devices. The energy harvesting devices can be produced as a film layer, e.g., a thin-film solar panel, a piezoelectric film, and so forth. In one embodiment, the exterior of the four triangular sides of the pyramid-shaped housing 400 can be partially or entirely covered with thin-film solar panel to harvest solar energy.

As shown in FIG. 4B, one triangular side of the pyramid-shaped housing 400 has been removed to show a plurality of cavities 450, 452 and 454 formed by horizontal panels 440 and 442 arranged inside of the housing 400. The various components of the sensor device can be housed in one or more cavities 450, 452 and 454 of the housing 400, and supported by the horizontal panels 440 and 442. Vertical panels can also be used instead or in combination with horizontal panels to form the cavities of the housing 400, and to support components of the sensor device 100. It should be understood that other mechanical fasteners or connection mechanisms can also be used including, for example, a slot/groove, snap joints and so forth to connect or support components of the sensor device 100 inside the housing 400. For example, the components of the sensor device 100 can be provided on a printed circuit board(s) (PCBs), which can take various shapes such as a triangular or other shape which can be engaged and supported inside of the housing 400 using slots, snap-joints, or other connector system. The energy harvesting devices, which are arranged on an external surface of the housing 400, can have their electrical wires (or cables) extend into the housing through a base 460 or other location of the housing 400.

Example Processes

Figure 5:
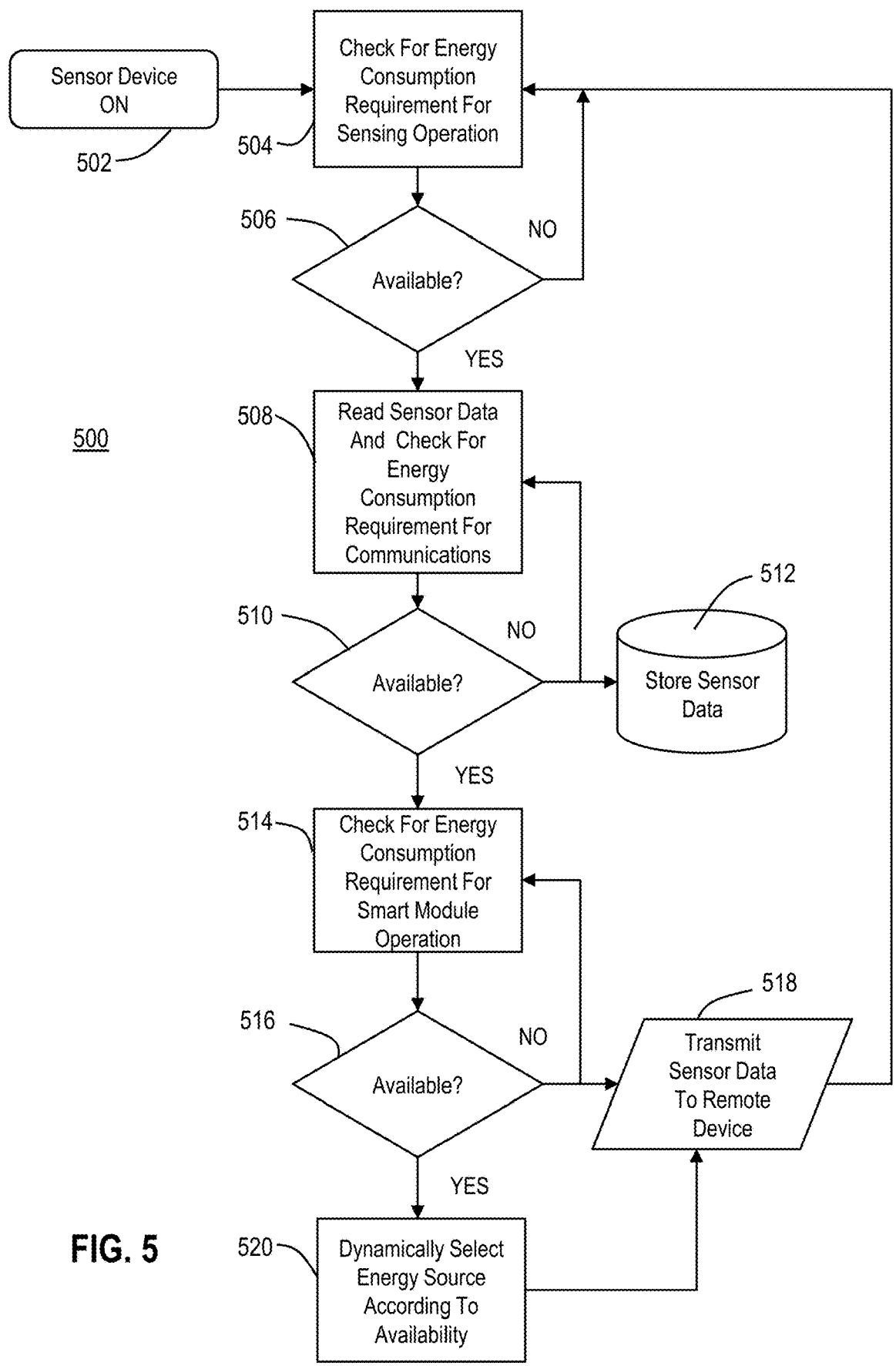
FIG. 5 is a flow diagram showing an example process by which a sensor device, such as in FIGS. 1 and 2, is powered and operated using ambient energy sources, in accordance with an example embodiment of the present disclosure.

FIG. 5 is a flow diagram showing an example process 500 by which a sensor device, such as the sensor 100 in FIGS. 1 and 2, is powered and operated using ambient energy sources, and selectively implements various operations according to an availability of energy from the ambient energy sources. For the purposes of explanation, the process 500 is discussed below with reference to the sensor device 100 and its components in FIG. 2.

The process 500 begins with the sensor device 100 turned ON or in the ON state. The power supply system 250 of the sensor device 100, independently or under control of the processor 202 of the controller 200, can set one or more of the ambient energy sources as a default energy source(s) from which to harvest energy. For example, the power supply system 250 can have its default energy source setting set as solar energy, electromagnetic energy, vibrational energy or thermal energy or other ambient energy sources. The default energy source setting can be determined according to the location, time, and environment associated with the sensor device (e.g., in an environment exposed to sunlight, electromagnetic energy, vibrational energy, thermal energy, etc.). The default energy source can, for example, be set through an input device (e.g., I/O 232) of the sensor device 100, or set from a remote device via a command communicated to the sensor device 100 across the network(s) 70. The remote device can be a BMS 20 or system 30, 40, 50 or 60, such as shown in FIG. 1. In operation, when the sensor device 100 is turned ON, the sensor device can attempt to draw power from the default energy source or from any of the ambient energy sources.

At reference 504, the processor 202 checks (or determines) for an energy consumption requirement for a sensing operation or components of the sensor device 100 associated therewith. The energy consumption requirement can be a minimum energy required to power one or more components of the sensor device 100 to perform base operations such as for example a sensing operation from one or more sensors 210 of the sensor device 100. At reference 506, the processor 202 determines whether there is sufficient power from the power supply system 250, which is harvesting energy from one or more of the ambient energy sources, to meet the energy consumption requirements for a sensing operation and/or other base operations of the sensor device 100. If not, the processor 202 proceeds back to references 504 and 506 to check if sufficient energy is available to implement the sensing operation of the sensor device 100. The processor 202 can check periodically or upon an occurrence of a triggering event or condition.

Otherwise, if there is sufficient power available for the sensing operation (or base operations), the process 500 proceeds to reference 508 where the processor 202 reads sensor data from one or more sensors 210 of the sensor device 100, or generates sensor data from data read from the one or more sensors 210. The sensor data corresponds to environmental condition(s) sensed by one or more of the sensors 210. The processor 202 also checks (or determines) an energy consumption requirement for a communication operation or components of the sensor device 100 associated therewith. The energy consumption requirement can be a minimum energy required to power one or more components of the sensor device 100 to perform communication, such as wire-line communications or wireless communications (e.g., RF communication via a ZigBee communication device). At reference 510, the processor 202 determines whether there is sufficient power from the power supply system 250, which is harvesting energy from one or more of the ambient energy sources, to meet the energy consumption requirement for a communications operation. If not, the processor 202 controls or causes the sensor data to be stored locally, such as in the local memory 230, at reference 512. The process 500 then proceeds back to references 508 and 510. In this way, sensor data can be stored locally until sufficient power becomes available to transmit the sensor data to a remote device(s) (e.g., BMS and/or other systems in FIG. 1).

Otherwise, if there is sufficient power available for the communication operation, the process 500 proceeds to reference 514 where the processor 202 checks (or determines) an energy consumption requirement for a smart module operation (e.g., dynamic selection feature) or components of the sensor device 100 associated therewith. The energy consumption requirement can be a minimum energy required to power one or more components of the sensor device 100 to perform the smart module operation, which can include dynamically selecting one or more energy sources from a plurality of ambient energy sources to power the one or more components of the sensor device 100. As previously discussed, the smart module operation can be implemented by a processor(s) which performs the base operations of the sensor device 100 (e.g., processor 202 of the controller 200), or can be implemented by a processor(s) in a separate, dedicated component (e.g., a smart module 240).

If there is insufficient power available for the smart module operation, the processor 202 controls or causes the communication device 220 (e.g., a ZigBee communication device) to transmit the sensor data to a remote device(s)

(e.g., BMS and/or other systems in FIG. 1) at reference 518. The process 500 then returns back to reference 504.

At reference 520, if there is sufficient power available for the smart module operation, the processor 202 itself or through the smart module 240 dynamically selects one or more energy sources from the plurality of ambient energy sources to power the one or more components of the sensor device 100 according to an availability of energy from the ambient energy sources and/or an energy consumption requirement of the one or more components. For example, the processor 202 obtains information from the energy harvesting devices of the power supply system 250 on a present or current availability of energy from each of the ambient energy sources. Based on this information, the processor 202 can determine which one(s) of the ambient energy sources to select to power the one or more components of the sensor device 100 according to various factors, including but not limited, for example, (1) an amount of available harvestable energy for each ambient energy source (e.g., which energy source presently provides the greatest amount of harvestable energy), (2) a time/day (e.g., daytime, night-time, hours of operation for a facility or various equipment at the facility, etc.) which may reflect a predicted or assumed period of available solar energy, electromagnetic energy, vibrational energy, and/or thermal energy at the sensor location(s) at the facility (e.g., facility 10 in FIG. 1), and/or (3) other factors to facilitate selection of ambient energy source(s) to power one or more components of the sensor device 100. The processor 202 itself or the processor 202 through or in combination with the smart module 240 can control the power supply system 250 (e.g., electrical switches 254) in the selection operation in order to harvest energy from a selected energy source(s) to power one or more components of the sensor device 100.

The processor 202 then controls or causes the communication device 220 (e.g., a ZigBee communication device) to transmit the sensor data to a remote device(s) (e.g., BMS and/or other systems in FIG. 1) at reference 518. The process 500 then returns back to reference 504.

As reflected in this example process 500, the sensor device 100 can be configured to selectively control or power different components or operations thereof according to energy consumption priority levels of each of the component(s) or operation(s). The process 500 is provided as an example. In various example embodiments, when the power generated from all of the ambient energy source(s) is insufficient, the sensor device 100 can also be configured to remain idle or to draw power from the energy storage device 270 (e.g., capacitor) or a battery 280 (if present) until sufficient ambient energy becomes available. During an active run state of the sensor device, the power supply system 250 of the sensor device 100 can transfer and store any excess energy harvested from the ambient energy to the energy storage device 270.

Furthermore, sensor data can remain buffered and may be overwritten by new data if there is limited memory capacity (e.g., limited flash/register memory). In a normal run state, the sensor device 100 can continually assess the sources of available energy required for smart module operation on a regular interval. If available, the sensor device 100 can dynamically allocate input energy source(s) according to the environment. If sufficient energy remains available in the environment from the initially selected energy source(s), which sufficiently meets the sum total of the energy needs of the sensor device 100, the sensor device 100 can be configured not to switch energy sources.

Figure 6:
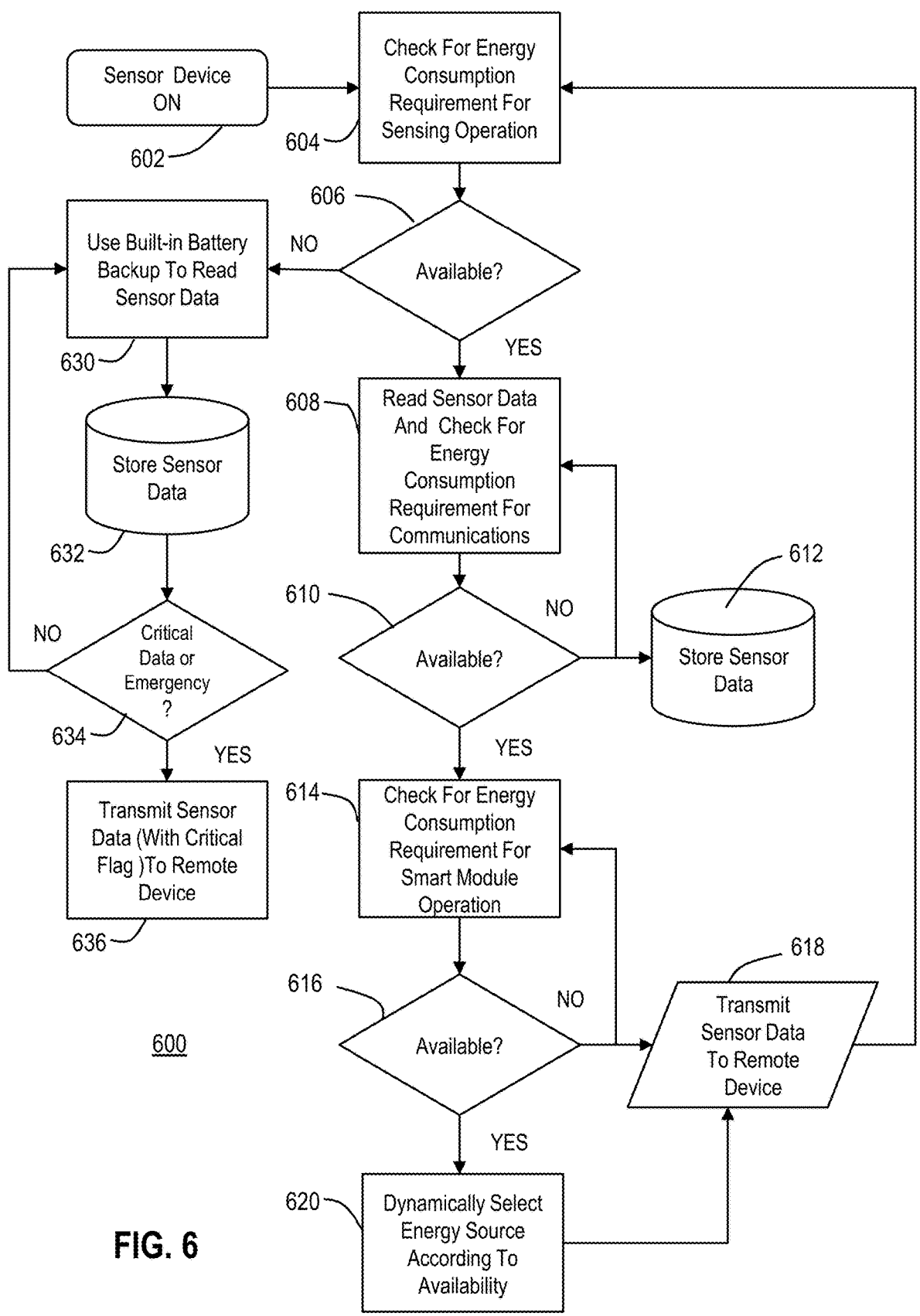
FIG. 6 is a flow diagram showing an example process by which a sensor device, such as in FIGS. 1 and 2, is powered and operated using ambient energy sources or a back-up battery, in accordance with a further example embodiment of the present disclosure.

FIG. 6 is a flow diagram showing an example process 600 by which a sensor device, such as the sensor 100 in FIGS. 1 and 2, is powered and operated using ambient energy sources and a back-up battery. For the purposes of explanation, the process 600 is discussed below with reference to the sensor device 100 and its components in FIG. 2.

The process 600 implements similar operations as in the process 500 of FIG. 5, except that a back-up battery can be used under certain circumstances to power components or operations of the sensor device 100 when insufficient power is available through the ambient energy sources. In this example, power from the back-up battery can be used under critical scenarios, e.g., for critical sensor data or an emergency when sensor data is need by a remote device(s) (e.g., BMS and/or other systems in FIG. 1).

The references 602, 604, 606, 608, 610, 612, 614, 616, 618 and 620 of the process 600 in FIG. 6 are the same or similar to references 502, 504, 506, 508, 510, 512, 514, 516, 518 and 520 respectively of the process 500 in FIG. 5 (which are described above), except that the process 600 proceeds to reference 630 from the reference 606 if there is insufficient power available, such as generated from energy harvested from the ambient energy sources, for the sensing operation or other basic operations of the sensing device 100.

At reference 630, the processor 202 controls or causes the power management system 206 of the controller 200 to power the sensing operation or other basic operations of the sensing device 100 using power from the back-up battery (e.g., battery 280). In the sensing operation, the processor 202 reads sensor data from one or more of the sensors 210 of the sensor device 100, or generates sensor data from data read from one or more of the sensors 210. At reference 632, the processor 202 controls or causes the sensor data to be stored, such as in a local memory (e.g., the local memory 230). At reference 634, the processor 202 determines whether a critical condition exists, e.g., whether the sensor data is critical data that is required by a remote device(s), or whether there is an emergency that requires the sensor data to be transmitted to the remote device(s) (e.g., BMS and/or other systems in FIG. 1). If a critical condition does not exist, the process 600 proceeds back to reference 630. The processor 202 can periodically or upon a triggering event or condition proceed back to reference 604 to check (or determine) whether energy is available through an ambient energy source to power one or more components of the sensor device 100. For example, if power available from a default ambient energy source reaches a threshold value, then the processor 202 may proceed back to reference 604. The processor 202 can check for power availability from the energy storage device 270, or the energy harvesting devices 260, 262, 264 and 266 of the power supply system 250.

If a critical condition exists, the processor 202 controls or causes the communication device 220 (which is now powered by the back-up battery) to transmit the sensor data to a remote device(s) at reference 636. The sensor data may also include a critical flag (e.g., identification information indicating the critical nature of the data). Thereafter, the process 600 can turn the sensor device 100 OFF for a predetermined period of time or until a triggering event or condition which turns the sensor device 100 back ON, can place the sensor device 100 in an idle state, or can proceed back to reference 604 after a predetermined period of time.

Example Sensor Device Model

To investigate the energy requirement for a commercial sensor device such as a sensor node, MICA2 MPR400 mote (wireless node and mote are used interchangeably) can be chosen, which operates between 2.7V to 3.3V and is manufactured by Crossbow Technology, Inc. The total energy consumption in an hour for one particular MICA2 mote with a sensor board using GSP (Gossip-based Sleep Protocol) is 120.12 J. This is an example of the basic energy requirement, such as for the base of the energy pyramid in FIG. 3. A proposed design of a sensor device, such as a wireless sensor node, can accommodate a ZigBee communication protocol which is a low-cost and low-power communication protocol. The ZigBee can draw 1.8 mW, 2.2 mW and 3.6 mW per node operation, respectively, for three types of modulation. Considering Frequency Shift Keying (FSK) modulation which draws 2.2 mW, the energy consumption for a ZigBee layer ends up at 7.92 J (e.g., for a middle layer of the energy pyramid of FIG. 3). FSK modulation is desirable because it can eliminate noise and decay better than other modulations.

The tip of the energy pyramid is reserved for smart module operation (e.g., operation of the dynamic selection feature). The smart module can be configured to intelligently identify other available sources of ambient energy once it senses a drop in the default ambient energy source, e.g., solar energy. This can allow the proposed sensor design to be ideal for most environments and harness the maximum possible ambient energy. For example, if the sensor device is unable to draw power from solar irradiation, it can adapt its energy harvesting devices (e.g., receptors) to use, for example, temperature change, RF or vibration to energize. Assessing the energy requirement for base operation, ten percent (10%) energy of base operation is likely required for smart module operation, e.g., 12.012 J.

An explanation is provided on how energy consumption of an active wireless sensor node can be met using a sensor device design that employs ambient energy receptors embedded in the sensor body. In this example design, a proposed sensor device model can have embedded solar panels on its surface which are exposed to solar irradiation during daytime, and can use solar energy to power operations of the device. As previously noted, a typical power density of solar energy yield is 100 mW/cm$^2$. The sensor node can have a pyramid-shaped housing (e.g., FIG. 4) with a working surface of 2700 mm$^2$ (on one side) and four surfaces total the available surface area to 10800 mm$^2$ (or 108 cm$^2$). Thus, the solar panels embedded on the sensor will be exposed to a total of 100 mW/cm$^2$*108 cm$^2$=10800 mW of power. Since industrial panels can have an average efficiency of 10%~15%; it can be assumed that the typical power yield will be 1080 mW=1.08 W. Accordingly, the energy input for one hour will be 1.08 W*3600 sec=3888 J which is well above the energy consumption per hour (e.g., more than 27 times). In absence of solar energy, the sensor device can dynamically sense and select other available sources of ambient energies to power the operations of the sensor device.

Residential and commercial buildings are major components of cities. Well-monitored buildings are typically more efficient, and thus, more sustainable. The sensor device of the present disclosure can provide an ambient wireless building sensor to improve monitoring of a building or other structure. The sensor device can provide increased environmental and economic benefits through a battery-less design while providing safe alternatives when a sensor device is located in hazardous areas. The design of the sensor device, which can enable wireless sensor devices to operate at a net-zero energy (actually net-positive energy) mode, provides for an economical and feasible green solution or impact that can be employed in cities and other urban environments.

It should be understood that devices, systems and methods described above are provided as examples. The various systems, such as in FIG. 1, can include processor(s), memory, communication devices and other components to provide or control services offered in the facility 10. Although the sensor device 100, as described herein, can be used in a facility, it can also be used in other settings to sense environmental condition(s).

It should also be understood that the example embodiments disclosed and taught herein are susceptible to numerous and various modifications and alternative forms. Thus, the use of a singular term, such as, but not limited to, "a" and the like, is not intended as limiting of the number of items.

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices can include, but are not limited to, disks, solid state drives, optical disks, removable memory devices such as smart cards, SIMs, WIMs, semiconductor memories such as RAM, ROM, PROMS, etc. Transmitting mediums include, but are not limited to, transmissions via wireless communication networks (e.g., Radio Frequency (RF) communication, the Internet, intranets, telephone/modem-based network communication, hard-wired/cabled communication network, satellite communication, and other stationary or mobile network systems/communication links.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A sensor device, comprising:
    one or more sensors to sense one or more environmental conditions;

a power supply system including a plurality of energy harvesting devices to harvest energy from a plurality of ambient energy sources for powering one or more components of the sensor device;

a memory to store sensor data associated with the one or more environmental conditions sensed by the one or more sensors;

a communication device for transmitting the sensor data to a remote device; and one or more processors configured:
to dynamically select one or more energy sources from the ambient energy sources to power one or more components of the sensor device according to an availability of energy from the ambient energy sources and/or an energy consumption requirement of the one or more components;
to control supply of power to the one or more components of the sensor device; and
to control a supply of available power from the power supply system selectively to the one or more sensors, the memory, the communication device, and the one or more processors according to an energy consumption priority level of an operation to be performed, and an availability of energy from the selected energy source,
wherein the one or more processors include a first processor of a controller configured to implement a sensing operation by the one or more sensors, and a second processor of a separate smart module configured to dynamically select one or more energy sources from the ambient energy sources, the available power being supplied to components of the sensor device in the following order from a higher energy consumption priority level to a lower energy consumption priority level: (1) the first processor, the one or more sensors and the memory to perform a sensing operation, (2) the first processor and the communication device to perform a communication operation, and (3) the second processor to perform a dynamic selection operation.

2. The sensor device of claim 1, wherein, to dynamically select, the one or more processors are configured:
to determine the energy consumption requirement for powering the one or more components;
to determine the available energy from each of the ambient energy sources; and
to select the one or more energy sources from the ambient energy sources based on the determined energy consumption requirement and the determined available energy.

3. The sensor device of claim 1, wherein the one or more processors are further configured:
to cause the sensor data to be stored in the memory when energy available from the ambient energy sources is insufficient to power the communication device.

4. The sensor device of claim 1, wherein the one or more processors are further configured:
to cause the sensor data to be transmitted via the communication device to the remote device when energy available from the ambient energy sources is sufficient to power the communication device.

5. The sensor device of claim 1, wherein the power supply system further comprises a battery, the one or more processors being further configured to cause power to be supplied from the battery to one or more components selected from the one or more sensors, the processors, the memory, the communication device, and the one or more processors when energy from the ambient energy sources is insufficient to power the one or more components.

6. The sensor device of claim 1, wherein at least one of the energy harvesting devices comprises a sensor from the one or more sensors.

7. The sensor device of claim 1, wherein the ambient energy sources include at least solar energy, vibrational energy, thermal energy, or radio frequency energy.

8. The sensor device of claim 1, wherein the energy harvesting devices comprises at least a solar energy transducer to harvest solar energy, an electromagnetic energy transducer to harvest electromagnetic energy, a thermal energy transducer to harvest thermal energy, and a piezoelectric transducer to harvest vibrational energy.

9. The sensor device of claim 1, further comprising:
a pyramid-shaped housing for housing the one or more sensors, the power supply system, the memory and the one or more processors.

10. The sensor device of claim 9, wherein one or more of the energy harvesting devices are formed as a film that is connected on or over a surface of the pyramid-shaped housing, the pyramid-shaped housing including one or more cavities therein to support at least a portion of the power supply system, the communication device, the memory and the one or more processors.

11. The sensor device of claim 1, wherein the power supply system further includes an energy storage device to store energy harvested from the energy harvesting devices.

12. A method of powering a sensor device using a plurality of ambient energy sources, the sensor device having one or more components including at least one sensor configured to sense an environmental condition, the method comprising:
dynamically selecting one or more energy sources from the ambient energy sources to power the one or more components of the sensor device according to an availability of energy from the ambient energy sources and/or an energy consumption requirement of the one or more components;
harvesting energy from the selected one or more energy sources;
supplying power, which is generated from the harvested energy, to the one or more components of the sensor device; and
controlling the supplied power selectively to the at least one sensor, a memory of the sensor device, a communication device of the sensor device, and a plurality of processors, according to an energy consumption priority level of an operation to be performed, and an availability of energy from the one or more energy sources,
wherein the plurality of processors includes a first processor of a controller configured to implement a sensing operation by the one or more sensors, and a second processor of a separate smart module configured to dynamically select one or more energy sources from the ambient energy sources, the available power being supplied to components of the sensor device in the following order from a higher energy consumption priority level to a lower energy consumption priority level: (1) the first processor, the at least one sensor and the memory to perform a sensing operation, (2) the first processor and the communication device to perform a communication operation, and (3) the second processor to perform a dynamic selection operation.

13. The method of claim 12, wherein the dynamically selecting comprises:

determining the energy consumption requirement for powering the one or more components;

determining the available energy from each of the ambient energy sources; and selecting the one or more energy sources from the ambient energy sources based on the determined energy consumption requirement and the determined available energy.

14. The method of claim 12, wherein the sensor device has two or more components, the method further comprising:

selectively powering each of the two or more components of the sensor device according to the energy consumption priority level of an operation to be performed by the sensor device and an availability of energy from the selected one or more energy sources.

15. The method of claim 14, further comprising:

storing sensor data corresponding to the environmental condition sensed by the sensor, wherein the sensor data is stored when energy available from the ambient energy sources is insufficient to power a communication device of the sensor device which is configured to transmit the sensing device to a remote device.

16. The method of claim 12, further comprising:

transmitting sensor data corresponding to the environmental condition sensed by the sensor to a remote device via a communication device of the sensor device, wherein the sensor data is transmitted when energy available from the ambient energy sources is sufficient to power the communication device.

17. The method of claim 12, wherein the sensor device further includes a battery, the method further comprising:

supplying power from the battery to the one or more components of the sensor device when energy from the ambient energy sources is insufficient to power the one or more components of the sensor device.

18. The method of claim 12, wherein energy from one of the ambient energy sources is harvested using the sensor of the sensor device.

19. The method of claim 12, wherein the ambient energy sources include solar energy, vibrational energy, thermal energy, and radio frequency energy.

20. The method of claim 12, further comprising:

housing the one or more components of the sensor device in a pyramid-shape housing.

21. A sensor device, comprising:

one or more sensors to sense one or more environmental conditions;

a power supply system including a plurality of energy harvesting devices to harvest energy from a plurality of ambient energy sources for powering one or more components of the sensor device;

a memory to store sensor data associated with the one or more environmental conditions sensed by the one or more sensors;

a communication device for transmitting the sensor data to a remote device; and one or more processors configured:

to dynamically select one or more energy sources from the ambient energy sources to power one or more components of the sensor device according to an availability of energy from the ambient energy sources and/or an energy consumption requirement of the one or more components; and to control supply of power to the one or more components of the sensor device; and a pyramid-shaped housing for housing the one or more sensors, the power supply system, the memory and the one or more processors, wherein one or more of the energy harvesting devices are formed as a film that is connected on or over a surface of the pyramid-shaped housing, the pyramid-shaped housing including one or more cavities therein to support at least a portion of the power supply system, the communication device, the memory and the one or more processors.

* * * * *